United States Patent
Muramatsu

(12) 
(10) Patent No.: US 6,305,675 B1
(45) Date of Patent: Oct. 23, 2001

(54) OSCILLATING FORCE GENERATOR AND VIBRATION DAMPER USING THE GENERATOR

(75) Inventor: Atsushi Muramatsu, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/633,352

(22) Filed: Aug. 4, 2000

(30) Foreign Application Priority Data

Aug. 27, 1999 (JP) ................................................. 11-241792

(51) Int. Cl.$^7$ ...................................................... F16F 15/03
(52) U.S. Cl. ........................................................ 267/140.14
(58) Field of Search ............ 267/140.11, 140.13–140.15, 267/136, 195, 279; 188/161, 163, 267, 178–180; 248/559, 636, 638; 180/300, 312

(56) References Cited

U.S. PATENT DOCUMENTS 6,059,275 * 5/2000 Muramatsu ...................... 267/140.14

FOREIGN PATENT DOCUMENTS

| 8-312718 | 11/1996 | (JP) . |
| 10-246283 | 9/1998 | (JP) . |
| 10-252817 | 9/1998 | (JP) . |
| 10-320059 | 12/1998 | (JP) . |

* cited by examiner

Primary Examiner—Christopher P. Schwartz
Assistant Examiner—C. T. Bartz
(74) Attorney, Agent, or Firm—Rossi & Associates

(57) ABSTRACT

An oscillating force generator is disclosed, wherein a yoke member has an annular groove in which a coil is disposed so as to be energized by an electric current for generating magnetic circuit around the coil, and for magnetizing an inner and outer circumferential wall portions of the yoke member as respective opposite magnetic poles at their open end portions. An oscillating member made of a magnetic material is disposed opposite to the one end face of the yoke member in an axial direction of the yoke member with a predetermined axial distance therebetween. The oscillating member has an inner and an outer circumferential portion which are located nearest to the open end portions of the inner and outer circumferential wall portions of the yoke member, respectively. The coil is energized for generating magnetic force acting on the oscillating member so that an oscillating force is generated between the oscillating member and the yoke member in the axial direction thereof. At least one of the open end portions of the inner and outer circumferential wall portions of the yoke member being directly opposed in the axial direction to the inner and/or outer circumferential portions of the oscillating member, while at least the other open end portion of the inner and outer circumferential wall portions having a first circumferential edge portion which is located nearest to a second circumferential edge portion in the inner and/or outer circumferential portions of the oscillating member. The first and second edge portions being offset from each other in a direction perpendicular to the axial direction, while being opposed to each other in a direction inclined with respect to the axial direction.

13 Claims, 8 Drawing Sheets

OSCILLATING FORCE GENERATOR AND VIBRATION DAMPER USING THE GENERATOR

BACKGROUND OF THE INVENTION

1. Field of the Invention

The present invention relates generally to an oscillating force generator suitably used in a vibration damper which is installed on a subject body or a member of a vibration system so as to actively exhibit an excellent vibration damping effect with respect to vibrations to be damped, that is, the vibrations generated in the subject body or transmitted through the member of the vibration system. More particularly, the present invention is concerned with an oscillating force generator used in an active-type vibration damping device and having a novel structure, and an active-type vibration damper equipped with the oscillating force generator of the invention.

2. Description of the Related Art

As means for damping or reducing vibration of a subject body, there has been employed a vibration damping device which is capable of reducing the vibration of the subject body owing to a vibration damping effect of a shock absorber, an elastic body or the like, and a vibration isolating device which is capable of reducing the vibration of the subject body owing to spring characteristics of a coil spring, an elastic body, or the like. These vibration damping and isolating devices are adapted to exhibit passively their vibration damping or isolating effect with respect to the vibration to be damped. Such a passive-type vibration damping or isolating device suffers from difficulty in exhibiting a sufficient vibration damping effect, when the vibration to be damped changes its vibration characteristics. To overcome this drawback, there has been developed an active-type vibration damper. The active-type vibration damper has an actuator adapted to generate an oscillating force corresponding to the vibration to be damped and apply the oscillating force to the subject body, thereby actively offsetting or absorbing the vibration to be damped.

In such an active-type vibration damper as described above, it is required to employ an oscillating force generator capable of generating an oscillating force whose frequency is suitably controllable. Examples of such an oscillating force generator are disclosed in U.S. Pat. No. 5,427,362 and JP-A-8-312718, wherein an electromagnetic drive device of a voice-coil type is employed as the oscillating force generator. The voice-coil type electromagnetic drive device includes a permanent magnet having opposite magnetic pole faces which are opposite to each other, and a moving coil disposed between the opposite pole faces of the permanent magnet. The moving coil is energized by a controlled electric current, whereby the coil is subject to a Lorents force or an electromagnetic force, so that the coil is moved to provide the desirably controlled oscillating force.

However, the conventional oscillating force generator of voicecoil type is likely to generate a relatively small oscillating force. For generating the desired oscillating force which is large enough to assure a high damping effect, the voice-coil type oscillating force generator tends to be large sized, and the electric power consumed by the generator is inevitably increased. The voice-coil type oscillating force generator also suffers from a problem of heat generated therein. While the moving coil and the permanent magnet is displaced relative to each other in the axial direction thereof upon energizing the moving coil, the moving coil and the pole faces of the permanent magnet are likely to be sliding contact with each other, causing undesirable noise, loss of energy, and damage to the contact parts of the moving coil and the permanent magnet.

Another type of oscillating force generator is disclosed in JP-A-10-246283 that is suitably used of the active-type vibration damping device, wherein an electromagnet is utilized. Such an electromagnet-type oscillating force generator includes a yoke member made of a magnetic material and having an annular groove open in one of its axially opposite end faces, and a coil accommodated in the annular groove of the yoke member. Upon energizing the coil by application of an electric current thereto, there is generated a magnetic path or circuit around the coil, so that the inner and outer wall portions of the annular groove of the yoke member are magnetized so as to have respective opposite magnetic poles or pole faces, on their open end portion. Further, the electromagnet-type oscillating force generator includes an oscillating member made of a magnetic material which is disposed axially opposite to the open end faces of the inner and outer wall portions of the yoke member with a given axial distance therebetween. In this condition, the coil is energized so that the oscillating force generator generates an electromagnetic force between the oscillating member and the yoke member in the axial direction thereof. This electromagnetic force acts on the oscillating member as an axial oscillating force, causing an axially reciprocal movement of the oscillating member.

This oscillating force generator of electromagnet-type permits a high-precise control of the oscillating force in terms of its frequency, phase or the like, by controlling the electric current applied to the coil. Further, the electromagnet-type oscillating force generator is capable of generating a sufficiently large oscillating force in comparison with the voice-coil type oscillating force generator.

In the conventional oscillating force generator of electromagnet type, however, the pole faces of the yoke member and the oscillating member are arranged to be directly opposed to each other in a direction in which these two members are displaced relative to each other, that is, in the axial direction thereof, with the predetermined axial distance therebetween. In this arrangement, the magnitude of the oscillating force generated by the oscillating force generator is significantly influenced by an amount of spacing between the yoke member and the oscillating member. Therefore, a slight difference in an initial position of the oscillating member relative to the yoke member may cause fail in generating desired oscillating force and a resultant fail in exhibiting a sufficient vibration damping effect. Thus, the conventional oscillating force generator is incapable of generating desired damping characteristics with stability.

SUMMARY OF THE INVENTION

It is therefore a first object of the present invention to provide an oscillating force generator for an active-type vibration damping device, which generator is novel in construction and which is capable of applying a sufficiently large oscillating force with ease and stability, while ensuring a frequency control of the oscillating force with ease and high preciseness.

It is a second object of the present invention to provide an active-type vibration damping device which is novel in construction and which is capable of exhibiting a desired vibration damping effect with efficiency and high stability, even in the case where an initial load acts on the vibration damping device, with the vibration damping device installed on a desired subject whose vibration is to be damped.

The first object of the present invention may be attained according to the following first through sixth modes of the invention, while the second object of the invention may be attained according to the following seventh and eighth modes of the invention. Each of these modes of the invention is numbered like the appended claims and depends from the other mode or modes, where appropriate, to indicate possible combinations of elements or technical features of the invention. However, it is to be understood that the present invention is not limited to those modes of the invention and combinations of the technical features, but may be otherwise recognized based on the thought of the present invention that disclosed in the whole specification and drawings or that may be recognized by those skilled in the art in the light of the disclosure in the whole specification and drawings.

(1) An oscillating force generator for an active-type vibration damper comprising: (a) a yoke member made of a magnetic material and having an annular groove open in one of axially opposite end faces thereof, such that the yoke member has an inner and an outer circumferential wall portion which are cooperate to partially define the annular groove; (b) a coil disposed in the annular groove of the yoke member, the coil being energized by an electric current applied thereto so that a magnetic circuit is formed around the coil, and that the inner and outer circumferential wall portions of the yoke member are magnetized as respective opposite magnetic poles at open end portions thereof, and (c) an oscillating member made of a magnetic material and disposed opposite to the one end face of the yoke member in an axial direction of the yoke member with a predetermined axial distance therebetween, the oscillating member having an inner and an outer circumferential portion which are located nearest to the open end portions of the inner and outer circumferential wall portions of the yoke member, respectively, the coil being energized for generating a magnetic force acting on the oscillating member so that an oscillating force is generated between the oscillating member and the yoke member in the axial direction thereof, at least one of the open end portions of the inner and outer circumferential wall portions of the yoke member being directly opposed in the axial direction to the inner and/or outer circumferential portions of the oscillating member, while at least the other open end portion of the inner and outer circumferential wall portions having a first circumferential edge portion which is located nearest to a second circumferential edge portion of the inner and/or outer circumferential portions of the oscillating member, the first and second circumferential edge portions being offset from each other in a direction perpendicular to the axial direction, while being opposed to each other in a direction inclined with respect to the axial direction.

In the oscillating force generator constructed according to the first mode (1) of this invention described above, the coil is energized by applying an electric current thereto, whereby the magnetic field is formed between the opposite magnetic poles of the yoke member. The oscillating member disposed within this magnetic field is subject to the magnetic force, so that the oscillating member is attracted or actuated by the magnetic force or attraction. In this arrangement, the oscillating member can be oscillated in a desired frequency, by suitably regulating the frequency of the electric current applied to the coil.

The yoke member has opposite magnetic poles at respective open end portions of the inner and outer circumferential wall portions thereof. At least one of the opposite magnetic poles is directly opposed to the corresponding inner and/or outer circumferential portions of the oscillating member in a direction in which the oscillating member is displaced i.e., in the axial direction, while at least the other opposite magnetic poles is opposed to the corresponding second circumferential edge portions of the oscillating member in the direction inclined with respect to the axial direction (hereinafter referred to as an "axially inclined direction"). In this arrangement, a sufficiently large magnetic force or attraction is generated between the magnetic pole(s) of the yoke member and the corresponding portion(s) of the oscillating member to which the magnetic pole(s) is directly opposed in the axial direction. On the other hand, between the magnetic pole(s) and the corresponding portion(s) of the oscillating member to which the magnetic pole(s) is opposed in the axially inclined direction, there is generated a magnetic force which acts on the oscillating member in the axially inclined direction, making it possible to reduce a variation of the magnitude of the magnetic force applied to the oscillating member with respect to a variation of the axial distance between the yoke member and the oscillating member.

The oscillating force generator of the first mode (1) of the present invention is capable of reducing the variation of the oscillating force due to dimensional errors between the yoke and oscillating members thereof, and is capable of exhibiting a desired oscillating force with effectiveness and stability, by regulating the electric current applied thereto. The present oscillating force generator can be applicable to active-type vibration damping devices for an automotive vehicle, such as an active vibration damper. In this case, the vibration damping device can exhibits a desired vibration damping effect with high stability. It should be noted that "the magnetic pole which is directly opposed to the corresponding portion of the oscillating member" is interpreted to mean that the magnetic pole and the corresponding portion of the oscillating member are opposed to each other in the axial direction, while being not offset relative to each other in the direction perpendicular to the axial direction. Between the yoke member and the oscillating member, there may be disposed an elastic member for elastically supporting the oscillating member on the yoke member such that the oscillating member is displaceable relative to the yoke member, and a buffer member for restricting in a shock absorbing manner an amount of movement of the oscillating member relative to the yoke member, as needed.

(2) An oscillating force generator according to the above mode (1), wherein the oscillating member is axially displaceable toward the yoke member until the first circumferential edge portion of the yoke member and the second circumferential edge portion of the oscillating member are overlapped with each other in the direction perpendicular to the axial direction, without abutting on each other in the axial direction.

In the above mode (2), the oscillating force generator can generate a sufficiently large oscillating force with high efficiency and stability, reducing the variation of the magnitude of the oscillating force due to the variation of the relative distance between the oscillating member and the yoke member.

(3) An oscillating force generator according to the above mode (1) or (2), an oscillating force generator according to claim 1, wherein the first and second edge portions partially defined by a first and a second cylindrical surfaces, respectively, the first and second cylindrical surfaces extending in the axial direction and being adjacent to each other, the first and second cylindrical surfaces being dimensioned such that the first and second cylindrical surfaces cooperate to define therebetween a clearance as seen in a projection in the axial direction.

In the oscillating force generator according to the mode (3) of the invention, the provision of the first and second cylindrical surfaces permits an effective and stable generation of the magnetic force or attraction generated between the first and second circumferential edge portions which extend along the first and second cylindrical surfaces, while being mutually opposed in the axially inclined direction and mutually offset from each other in the direction perpendicular to the axial direction.

(4) An oscillating force generator according to any one of the above modes (1)–(3), wherein a distance between the first and second edge portions which are opposed to each other in the direction inclined with respect to the axial direction is not larger than a distance between the at least one of the open end portions of the inner and outer circumferential wall portions of the yoke member and the inner and/or outer circumferential portions of the movable member which are opposed to each other in the axial direction.

The oscillating force generator according to the above mode (4), makes it possible to reduce with improved efficiency the variation of the magnitude of the oscillating force due to the variation of the distance between the yoke and oscillating members. In the combination of the modes (3) and (4), particularly, it is preferably that the value of difference between the radius of the inner and outer circumferential surfaces is made smaller than the value of the axial distance between the upper end face(s) of the inner and/or outer cylindrical wall portions 26, 28 and the corresponding inner and outer circumferential portion(s) of the oscillating member in the axial direction.

(5) An oscillating force generator according to any one of the above modes (1)–(4), wherein the inner circumferential wall portion of the yoke member axially outwardly protrudes from the open end portion of the outer circumferential wall portion of the yoke member, while the oscillating member has a central recess which is open in one of axially opposite end faces of the oscillating member that is axially opposed to the yoke member, and which has an inner diameter larger than a diameter of the inner circumferential wall portion of the yoke member, the one axial end face of the oscillating member being directly opposed at the outer circumferential portion thereof to the open end portion of the outer circumferential wall portion of the yoke member, while being opposed at the second circumferential edge portion formed at an open end portion of the central recess to the first circumferential edge portion formed at the open end portion of the inner circumferential wall portion in the direction inclined with respect to the axial direction, the central recess having a bottom surface which is directly opposed in the axial direction to the open end portion of the inner circumferential wall portion of the yoke member with an axial distance therebetween, which axial distance is made larger than the distance between the second circumferential edge portion and the first circumferential edge portion in the direction inclined with respect to the axial direction.

This arrangement permits effectively forming between the yoke and oscillating members, both of a pair of portions which are opposed to each other in the axial direction so as to generate therebetween the magnetic attraction in the axial direction, and a pair of portions which are opposed to each other in the axially inclined direction so as to generate therebetween the magnetic attraction in the axially inclined direction.

(6) An oscillating force generator according to any one of the above modes (1)–(5), wherein the inner circumferential wall portion of the yoke member axially outwardly protrudes from the open end portion of the outer circumferential wall portion of the yoke member, while the oscillating member has a first central recess which is open in one of axially opposite end faces of the oscillating member that is axially opposed to the yoke member, and which has an inner diameter larger than an outer diameter of the outer circumferential wall portion of the yoke member, the first central recess having the second circumferential edge portion at an open end portion thereof, the second circumferential edge portion being opposed to the first circumferential edge portion formed at a radially outer circumferential edge portion of the outer circumferential wall portion of the yoke member in the direction inclined with respect to the axial direction, while a bottom surface of the first central recess being directly opposed to in the axial direction to the open end portion of the outer circumferential wall portion with an axial distance therebetween, which axial distance is made larger than a distance between the second circumferential edge portion and the first circumferential edge portion in the direction inclined with respect to the axial direction, the first central recess having a second central recess open in an bottom surface of the first central recess, the second central recess having an inner diameter larger than the diameter of the inner circumferential wall portion of the yoke member, and having the second circumferential edge portion at an open end portion thereof, the second circumferential edge portion of the second recess being opposed to the first circumferential edge portion formed in the open end portion of the inner circumferential wall portion of the yoke member in the direction inclined with respect to the axial direction, while a bottom surface of the second central recess is directly opposed in the axial direction to the open end portion of the inner circumferential wall portion with an axial distance therebetween, which axial distance is made larger than a distance between the second circumferential edge portion and the first circumferential edge portion in the direction inclined with respect to the axial direction.

In the oscillating force generator according to the above mode (7), the yoke and oscillating members are axially directly opposed to each other both in their inner and outer circumferential portions, respectively, so that the magnetic force or attraction is sufficiently generated in the axial direction between the yoke and oscillating members. In addition, the yoke and oscillating members have respective first and second circumferential edge portions which are opposed to each other in the direction inclined with respect to the axial direction, both in their inner and outer circumferential portions, resulting in a further reduction in variation of the magnitude of the oscillating force with respect to the variation of the initial position of the oscillating member relative to the yoke member.

(7) An active-type vibration damper comprising: a mounting member attachable to a subject body vibration of which to be damped; a mass member; an elastic body elastically connecting the mass member to the mounting member; and an actuator for oscillating the mass member including an oscillating force generator defined in the above mode (1), the oscillating force generator being accommodated in the vibration damper such that the yoke member is fixedly supported by the mounting member, while the oscillating member is fixedly secured to the mass member, so that the oscillating force generator applying the oscillating force to the mass member.

In the vibration damper constructed according to the above mode (7), the oscillating force generator constructed according to the present invention is employed as an actuator, so that the actuator exhibiting a desired oscillating force with high stability, while reducing the variation of the oscillating force due to the variation of the positions of the oscillating and yoke members relative to each other. Accordingly, the vibration damper can exhibit effectively a desired vibration damping effect with high stability. For instance, the present vibration damper is capable of generating a desired oscillating force with high stability, even in the case where the statistic load acts on the vibration damper with the vibration damper installed between members of a vibration system whose vibration to be damped, and the positions of the yoke and oscillating members relative to each other is accordingly changed.

(8) An active-type vibration damper according to the above mode (7), further comprising a guide rod fixed to the yoke member so as to extend axially outwardly from the yoke member toward the mass member, the mass member having a through hole through which the guide rod extend in an axial direction thereof, so that the mass member is disposed radially outwardly of the guide rod, while being reciprocally movable in the axial direction of the guide rod.

According to the vibration damper of the above mode (8), the provision of the guide rod ensures a reciprocal movement of the mass member in the axial direction, while avoiding irregular displacement of the mass member, resulting in an excellent vibration damping effect with high stability. This guide rod may also be structured as a fail-safe system for preventing the mass member being removed from the yoke member, or alternatively be utilized as a member for supporting or fixing the elastic member which elastically supports the mass member on the yoke member.

BRIEF DESCRIPTION OF THE DRAWINGS

The above and optional objects, features, advantages and technical significance of the present invention will be better understood by reading the following detailed description of the presently preferred embodiments of the invention, when considered in conjunction of the accompanying drawings, in which.

DETAILED DESCRIPTION OF THE PREFERRED EMBODIMENTS

Figure 1:
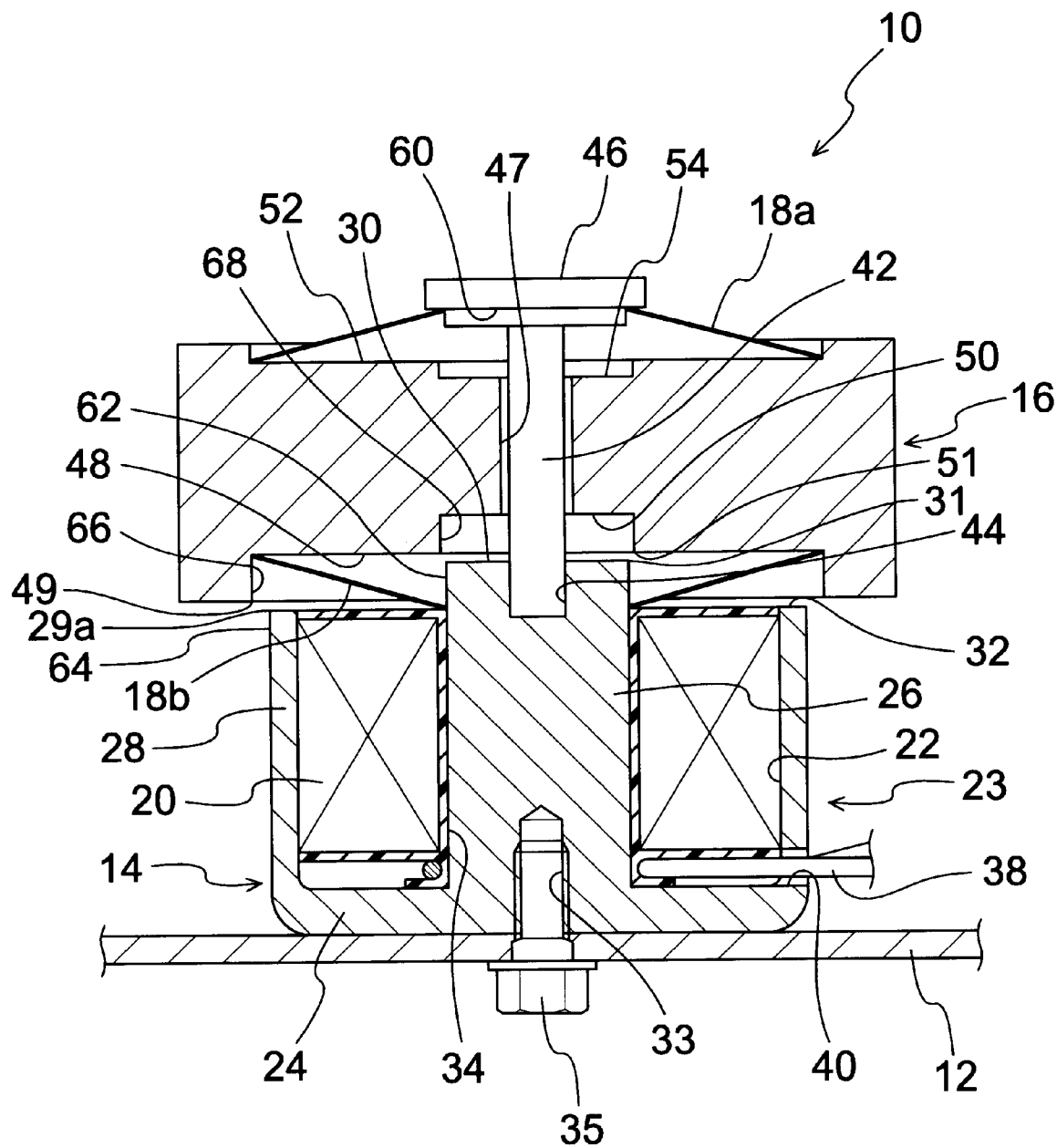
FIG. 1 is an elevational view in longitudinal cross section of a vibration damper constructed according to one embodiment of the present invention.

Referring first to FIG. 1, there is shown a vibration damper 10 constructed according to a first embodiment of the present invention. The vibration damper 10 includes a mounting member 14 attachable to a vibratile body 12 such as a body of an automotive vehicle, and a mass member 16 which is elastically connected with the mounting member 14 via an elastic body in the form of a pair of metallic springs 18a, 18b interposed between the mounting member 14 and the mass member 16. That is, the vibration damper 10 constitute a vibration system wherein the mass member 16 functions as a mass system and the metallic springs 18a, 18b function as a spring system. The vibration damper 10 further includes a coil 20 which is fixedly secured to the mounting member 14. The coil 20 is energized by an application of an alternating or pulsating electric current, so as to generate a magnetic force acting on the mass member 16 for displacing the mass member relative to the mounting member 14 or the coil 20. That is, the mounting member 14 and the coil 20 secured to the mounting member 14 constitute an actuator 23 as an oscillating force generator. In the dynamic damper 10, oscillation of the mass member 16 is effectively controlled by the actuator 23, for thereby actively damping or reducing the vibration of the vibratile body 12. The dynamic damper 10 is arranged to exhibit an excellent vibration damping effect with respect to a vibrational load primary in the vertical direction as seen in FIG. 1. In the following description, an upper and a lower side or direction are interpreted to mean the upper and lower sides or directions as seen in FIG. 1.

Described more specifically, the mounting member 14 is made of a ferromagnetic material such as iron. The mounting member 14 is a generally cylindrical block member and has an annular groove 22 formed at a radially intermediate portion thereof, so as to continuously extend in the circumferential direction of the mounting member 14, while having a predetermined width. The annular groove 22 is open in the axially upper end face of the mounting member 14. In the provision of the annular groove 22, the mounting member 14 includes a bottom wall portion 24 having a disk-like shape, an inner circumferential wall portion 26 having a cylindrical-rod shape, which is located radially inwardly of the annular groove 22 while being integrally formed on and protrudes axially outwardly or upwardly from the central portion of the axially upper end face of the bottom wall portion 24, and a hollow cylindrical shaped outer circumferential wall portion 28 having a hollow cylindrical shape, which is located radially outwardly of the annular groove 22 while being integrally formed on and protrudes axially outwardly or upwardly from the circumferential portion of the axially upper end face of the bottom wall portion 24. In the present embodiment, the inner circumferential wall portion 26 has an axial length which is larger than that of the outer circumferential wall portion 26, so that a protruding end face 30 of the inner circumferential wall portion 26 is located axially upwardly with respect to a protruding end face 32 of the outer circumferential wall portion 28. The mounting member 14 further has a threaded hole 33 which is open in a central portion of the axially lower end face of the mounting member 14. The mounting member 14 is superposed on the vibratile body 12 at its lower end face and secured to the vibratile body 12 by a fixing bolt 35 screwed in the threaded hole 33.

In the annular groove 22, there is fixedly accommodated a coil 20 which is wound in a bobbin 34 made of a non-magnetic material, such that the coil is wound in the circumferential direction of the groove 22 so as to extend along an circumference of the inner circumferential wall portion 26. A conductor wire 38 for applying an electric current to the coil 20 extends from the coil 20 toward the external area through a through hole 40 formed through the outer circumferential wall portion 28 of the mounting member 14.

Upon application of the suitably controlled electric current to the coil 20 through the conductor wire 38, there are generated magnetic lines of force around the coil 20. Since the mounting member 14 is made of a ferromagnetic material as described above, these magnetic lines of force pass through the mounting member 14. This means that the mounting member 14 functions as a yoke member in the present embodiment. In the mounting member 14 functioning as the yoke member, the inner and outer circumferential wall portions 26, 28 and the bottom wall portion 24, which are disposed around the coil 20, cooperate to form a magnetic circuit or path. This magnetic circuit is open in the axially upper end face of the mounting member 14, whereby the both end faces of the magnetic circuit are located at the axially upper end faces of the inner and outer circumferential wall portions, respectively. That is, the protruding end faces 30, 32 of the inner and outer circumferential wall portions 26, 28 have respective opposite magnetic poles.

The mounting member 14 further includes a guide rod 42 fixedly secured to the protruding end face 30 of its inner circumferential wall portions 26. This guide rod 42 is a rod member having a constant diameter and a circular shape in cross section. The guide rod 42 is press-fitted at one of its axially opposite end portions in a fixing hole 44 open in a central portion of the protruding end face 30 of the inner circumferential wall portion 26, such that the guide rod 42 is arranged in a coaxial relationship with and extends axially outwardly or upwardly from the inner circumferential wall portion 26. The guide rod 42 carries a disk-like shaped support plate 46 integrally formed at its the other end portions. The support plate 46 extends generally in a direction perpendicular to the axial direction of the guide rod 42.

The mass member 16 is a generally cylindrical block member having a relatively large wall thickness. The mass member 16 has a through hole 47 extending through its central portion in its axial direction. The guide rod 42 is inserted into the through hole 47, so that the mass member is disposed radially outwardly of the guide rod 42. The through hole 47 of the mass member 16 has a diameter which is larger than the guide rod 42, permitting an axial displacement of the mass member 16 while avoiding a mutual contact between the mass member 16 and the guide rod 42. The material of the mass member 16 is not particularly limited, but may preferably be selected from among high gravity materials, especially, materials having a gravity higher than that of water, e.g., metal. In the present embodiment, the mass member 16 is integrally formed of a ferromagnetic material such as iron over its entire body.

Figure 2:
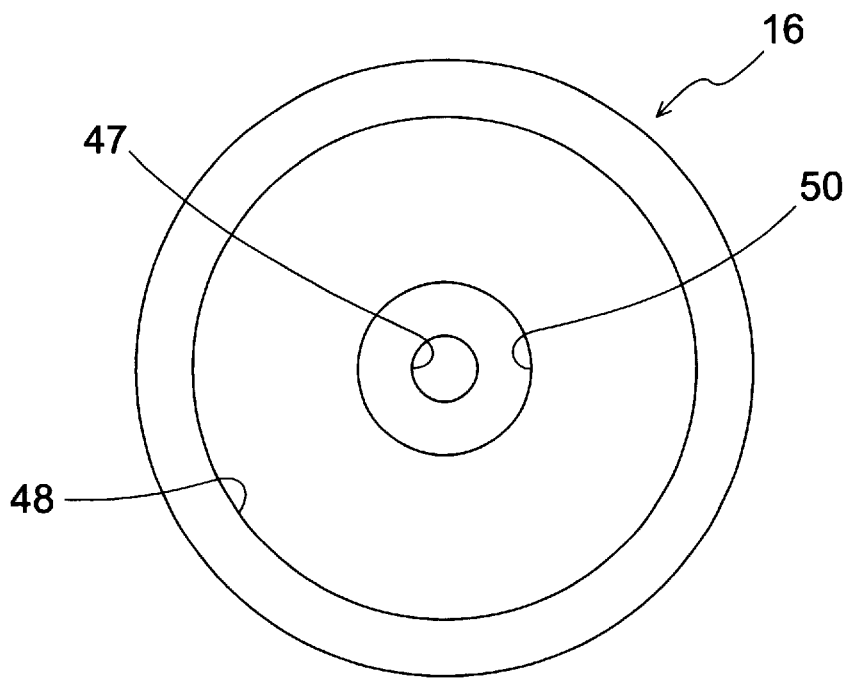
FIG. 2 is a bottom plane view of a mass member as a yoke member used in vibration damper of FIG. 1.

The mass member 16 has an outer diameter which is larger than that of the mounting member 14. As is apparent from FIG. 2 illustrating a bottom plane view of the mass member 16, the mass member 16 has a first lower-side recess 48 which has a generally cylindrical shape and is open in its axially lower end face. The cylindrical inner circumferential surface of the first lower-side recess 48 has a diameter slightly larger than the outer diameter of the outer circumferential wall portion 28 of the mounting member 14. The mass member 16 further has a second lower-side recess 50 which has also a generally cylindrical shape and is open in the central portion of the bottom surface of the first lower-side recess 48. The cylindrical inner circumferential surface of the second lower-side recess 50 has a diameter slightly larger than the outer diameter of the inner circumferential wall portion 26 of the mounting member 14. The first and second lower-side recesses 48, 50 are arranged in a coaxial relationship with each other on the axis of the mass member 16, and are open toward the mounting member 14. The mass member 16 also has a first and second upper-side recesses 52, 54 which correspond to the first and second lower-side recesses 48, 50, respectively. The first and second upper-side recesses 52, 54 are dimensioned so as to have an axial length which is made smaller than that of the first and second lower-side recesses 48, 50.

Figure 3:
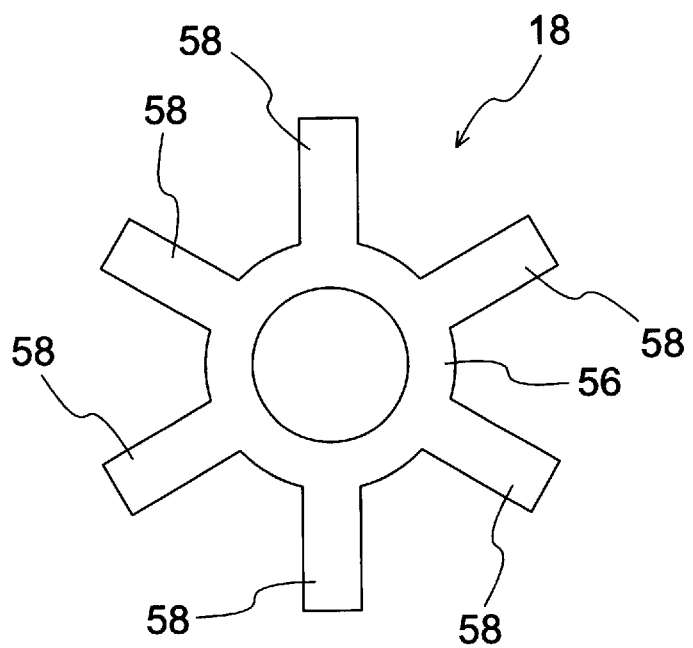
FIG. 3 is a top plane view of a metallic spring as an elastic body used in the vibration damper of FIG. 1.

The vibration damper 10 has a pair of an upper and lower metallic springs 18a, 18b, as the elastic body. The upper metallic spring 18a is disposed between the axially upper end face of the mass member 16 and the supporting plate 46 of the guide rod 42. On the other hand, the lower metallic spring 18b is disposed between the axially lower end face of the mass member 16 and the axially upper end face of the bobbin 34. Each of the metallic spring 18a, 18b may be disk spring made of a non-magnetic material such as stainless steel or an aluminum alloy. As is apparent from FIG. 3, each metallic spring 18 consists of an annular mounting portion 56 and a plurality of elastic plate portions 58 (six plate portions in the present embodiment) which is integrally formed in the respective circumferential positions of the outer circumferential portion of the annular mounting portion 56, so as to extend radially outwardly with a flat plate shape. The elastic plate portions 58 are equally spaced apart from each other in the circumferential direction of the annular mounting portion 58 at a constant angular interval.

The lower metallic spring 18b is disposed between the mass member 16 and the bobbin 34 such that the annular mounting portion 56 is disposed radially outwardly of the inner circumferential wall portion 26 and is superposed on the axially upper end face of the bobbin 34. In this condition, the lower metallic spring 18b is suitably positioned relative to the mounting member 14 in the direction perpendicular to the axial direction. Each of the elastic plate portions 58 extends toward the inside of the first lower-side recess 48 and is held in contact at its radially outward end face with the circumferential corner defined by the cylindrical inner circumferential surface and the bottom surface of the first lower-side recess 48, so that the lower metallic spring 18b is effectively positioned relative to the mass member 16 in the direction perpendicular to the axial direction.

On the other hand, the upper metallic spring 18a is disposed between the mass member 16 and the support plate 46 of the guide rod 42, such that the annular mounting portion 56 is radially outwardly disposed of a generally cylindrical boss portion 60 formed in the axially lower end face of the support plate 46. In this condition, the upper metallic spring 18a is effectively positioned relative to the mounting member 12 in the direction perpendicular to axial direction via the guide rod 42. Each of the elastic plate portions 58 extends toward the inside of the first upper-side recess 52 and is held in contact at its radially outward end face with the circumferential corner defined by the cylindrical inner circumferential surface and the bottom surface of the first upper-side recess 52, so that the upper metallic spring 18a is effectively positioned relative to the mass member 16 in the direction perpendicular to the axial direction.

In the provision of the upper and lower metallic springs 18a, 18b disposed respectively on the axially upper and lower end faces of the mass member 16, the mass member 16 is elastically supported by these upper and lower metallic springs 18a, 18b such that the mass member 16 is held by the metallic springs 18a, 18b, in its original or neutral position, that is, in an axially intermediate portion of the guide rod 42. The elastic deformation of the metallic springs 18a, 18b permits the mass member to be displaced and oscillated in the axial direction. In this respect, the elastic force of the metallic springs 18a, 18b are suitably adjusted such that the mass member 16 is held in its original position owing to the balance of the elastic force of the upper and lower metallic springs 18a, 18b, when no magnetic force acts on the mass member 16.

That is, the mass member 16 is effectively supported and positioned in the axial direction by the upper and lower metallic springs 18a, 18b, permitting a stable displacement of the mass member 16 in the axial direction, while avoiding even a sliding contact of the mass member 16 with the guide rod 42. When the mass member 16 is subject to a significantly large load in the direction perpendicular to the axial direction, the excessively large amount of displacement of the mass member 16 in the direction perpendicular to the axial direction is surely avoided or restricted by an abutting contact of the mass member 16 with the guide rod 42.

With the mass member 16 elastically supported by the upper and lower metallic springs 18a, 18b, the axially lower end face of the mass member 16 is opposed to axially upper end portions of the inner and outer circumferential wall portions 26, 28 in the axial direction with the respective axial distance therebetween. In this condition, the coil is energized by the electric current for thereby generating a magnetic force around the coil 20. The mass member 16 is subject to the magnetic force, resulting in the mass member 16 is attracted by the magnetic force in the axially downward direction. In operation of the vibration damper 10, the electric current applied to the coil 20 is suitably adjusted on the basis of suitable control signal or signals, so that the vibration damper 10 can apply to the vibratile body 12 desired oscillating force whose frequency, phase, and/or amplitude corresponds to that of the vibration to be damped, that is, the vibration in the vibratile body 12, thereby actively offsetting or reducing the vibration in the vibratile body 12. It is preferably that the control signal may be a signal whose amplitude corresponding to that of the vibration to be damped, which is detected by an accelerometer or acceleration sensor, or alternatively is an ignition pulse signal detected from the internal combustion engine when the vibration damper 10 is used for an automotive vehicle.

In the present embodiment, the mounting member 14 functioning as the yoke member, is arranged such that each of the axially upper end faces of the inner and outer circumferential wall portions 26, 28 include both of a "direct-opposite portion" which is directly opposed to the bottom surface of the corresponding lower-side recesses of the mass member 16, and an "inclined-opposite portion" which is opposed in an inclined direction with respect to the axial direction (hereinafter referred to as an "axially inclined direction") to the edge portion of the corresponding recess of the mass member 16 in a direction inclined with respect to the axial direction (hereinafter referred to as an "axially inclined direction").

Figure 4:
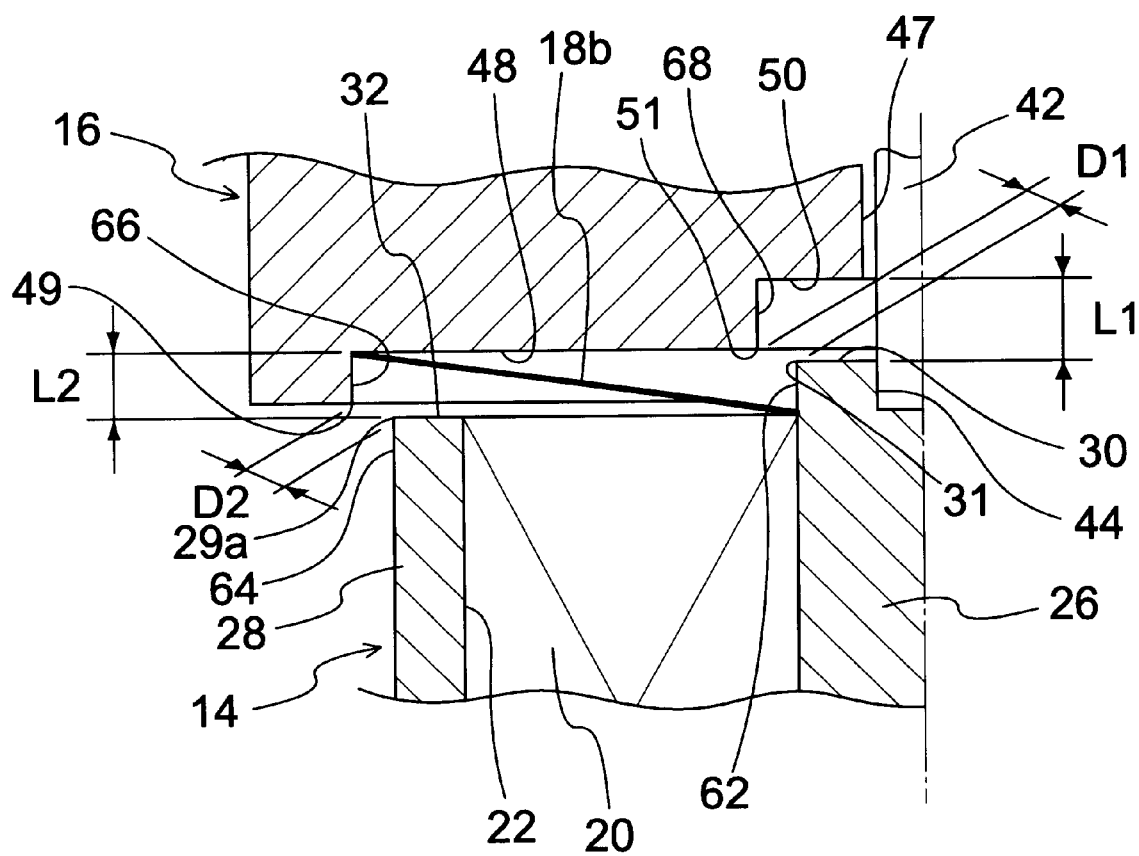
FIG. 4 is a fragmentary enlarged view showing a principal part of the vibration damper of FIG. 1.

Referring next to FIG. 4, the axially upper end portion of the inner circumferential wall portion 26 is directly opposed in the axial direction at its protruding end face 30 to the bottom surface of the second lower-side recess 50 of the mass member 16, while being opposed at its circumferential edge portion 31 as a first circumferential edge portion to an open-end edge portion 51 of the second lower-side recess 50 as a second circumferential edge portion in the axially inclined direction. On the other hand, the axially upper end portion of the outer circumferential wall portion 28 is directly opposed at its protruding end face 32 to the bottom surface of the first lower-side recess 48 in the axial direction, while being opposed at its outer circumferential edge portion 29a as the first circumferential edge portion to an open-end edge portion 49 of the first lower-side recess 48 as the second circumferential edge portion in the axially inclined direction.

When the coil 20 is not energized by the electric current and the mass member 16 is not subject to the magnetic force, the mass member 16 is held in the above-indicated original position, and is positioned relative to the mounting member 14 such that the distance: L1 in the axial direction between the "direct-opposite portion" of the inner circumferential wall portion 26 (i.e., the protruding end face 30) and the corresponding portion of the mass member 16 (i.e., the bottom surface of the second lower-side recess 50) is not smaller than the distance: D1 in the axially inclined direction between the inclined-opposite portion of the inner circumferential wall portion 26 (i.e., circumferential edge portion 31) and the corresponding portion of the mass member 16 (i.e., the open-end edge portion 51 of the second lower-side recess 50), and such that the distance: L2 in the axial direction between the direct-opposite portion of the outer circumferential wall portion 28 (i.e., the protruding end face 32) and the mass member (i.e., the bottom surface of the first lowerside recess 48) is not smaller than the distance:D2 in the axially inclined direction between the inclined-opposite portion of the outer circumferential wall portion 28 (i.e., outer circumferential edge portion 29a) and the corresponding portion of the mass member 16 (i.e., the open-end edge portion 49 of the first lower-side recess 48). In the present embodiment, for example, the above-indicated distances: L1, L2, D1, D2 satisfy the following inequalities:

L1>D1, and

L2>D2

The mass member 16 which is desirably positioned in its original position relative to the mounting member 14 as described above, is axially displaceable toward and away from the mounting member 14, owing to the elastic deformation of the metallic spring 18, 18. When the mass member 16 is axially displaced toward the mounting member 14, the axially upper end portions of the inner and outer circumferential wall portions 26, 28, are placed within the second and first lower-side recesses 50, 48, respectively, without contacting with the mass member 16.

In the vibration damper 10 constructed as described above, the coil 20 is energized by the electric current, so that the mass member 16 is subject to the magnetic force generated in the mounting member 14, whereby the mass member 16 is moved or attracted toward the mounting member 14, i.e., in the axially downward direction as seen in FIG. 1, based on the magnetic force applied thereto. Therefore, the vibration damper 10 is capable of effectively exhibiting a relatively large oscillating force in comparison with the conventionally used electromagnetic actuator such as a voice-coil type. Further, the both of the protruding end faces 30, 32 of the inner and outer circumferential wall portions 26, 28, which are magnetized as the respective opposite magnetic poles appears, are directly opposed to the corresponding portions of mass member 16 in the axial direction. This arrangement is effective to generate a relatively large magnetic attraction acting on the mass member 16, so that the vibration damper 10 can exhibit a sufficiently large oscillating force to be applied to the mass member 16, with high efficiency.

In addition, the circumferential edge portion 31 of the inner circumferential wall portion 26 and the outer circumferential edge portion 29a of the outer circumferential wall portions 28 are opposed to the corresponding edge portions 51, 49 of the mass member 16 in the axially inclined direction with the respective distances: D1, D2 therebetween, which are made smaller than the respective distances: L1, L2 between the protruding end faces 30, 32 and the corresponding portions of the mass member 16. This makes it possible to decrease an amount of change in magnetic attraction acting on the mass member 16, with respect to an amount of change in relative distance between the mounting member 14 and the mass member 16, even when the initial position of the mass member relative to the mounting member 14 is undesirably changed or varied, and when the mass member 16 is axially reciprocally displaced. Therefore, the vibration damper 10 is capable of generating a desired oscillating force with high stability, and accordingly exhibits a desired vibration damping effect with high stability, irrespective of variations of the initial position of the mass member 16 relative to the mounting member 14.

The above-indicated decrease in the amount of change in the magnetic attraction with respect to the amount of change in the relative distance between the mounting member 14 and the mass member 16 might be caused by the following technical reasons: Namely, the respective opposite magnetic poles generated in the circumferential edge portion of the inner circumferential wall portion 26 and the outer circumferential edge portion 29a of the outer circumferential end portion 28, are opposed to the corresponding opposite magnetic poles generated in the respective open-end edge portions 51, 49 of the second and first lower-side recesses 50, 48 of the mass member 16 in the axially inclined direction, so that axial components of the magnetic attraction generated between the mutually opposite magnetic poles in the inclined axial direction, act on the mass member 16 as a driving or oscillating force in the axial direction.

In addition, one of opposite magnetic poles generated in the circumferential edge portion 31 of the inner circumferential wall portion 26 extends axially downward direction along a cylindrical outer circumferential surface 62 of the inner circumferential wall portion 26, while the other magnetic pole generated in the open-end edge portion 51 of the second lower-side recess 50 also extends axially upward direction along a cylindrical inner circumferential surface 68 of the second lower-side recess 50. Thus, an effective opposite magnetic poles are axially moved along the respective outer and inner circumferential surfaces 62, 68, with a constant distance therebetween in the axially inclined direction, as the mounting member 14 and the mass member 16 are axially displaced relative to each other. On the other hand, one of the opposite magnetic pole generated in the outer circumferential edge 29a of the outer circumferential wall portion 28 extends axially downward direction along a cylindrical outer circumferential surface 64 of the outer circumferential wall portion 28, while the other magnetic pole generated in the open-end edge portion of the first lower-side recess 48 extends axially upward direction along a cylindrical inner circumferential surface 66 of the first lower-side recess 48. Like in the case of the inner circumferential wall portion 28 and the second lower-side recess 50, the effective opposite magnetic poles are axially moved along the respective outer and inner circumferential surfaces 64, 66, with a constant distance therebetween in the axially inclined direction, as the mounting member 14 and the mass member 16 are axially displaced relative to each other.

Figure 5:
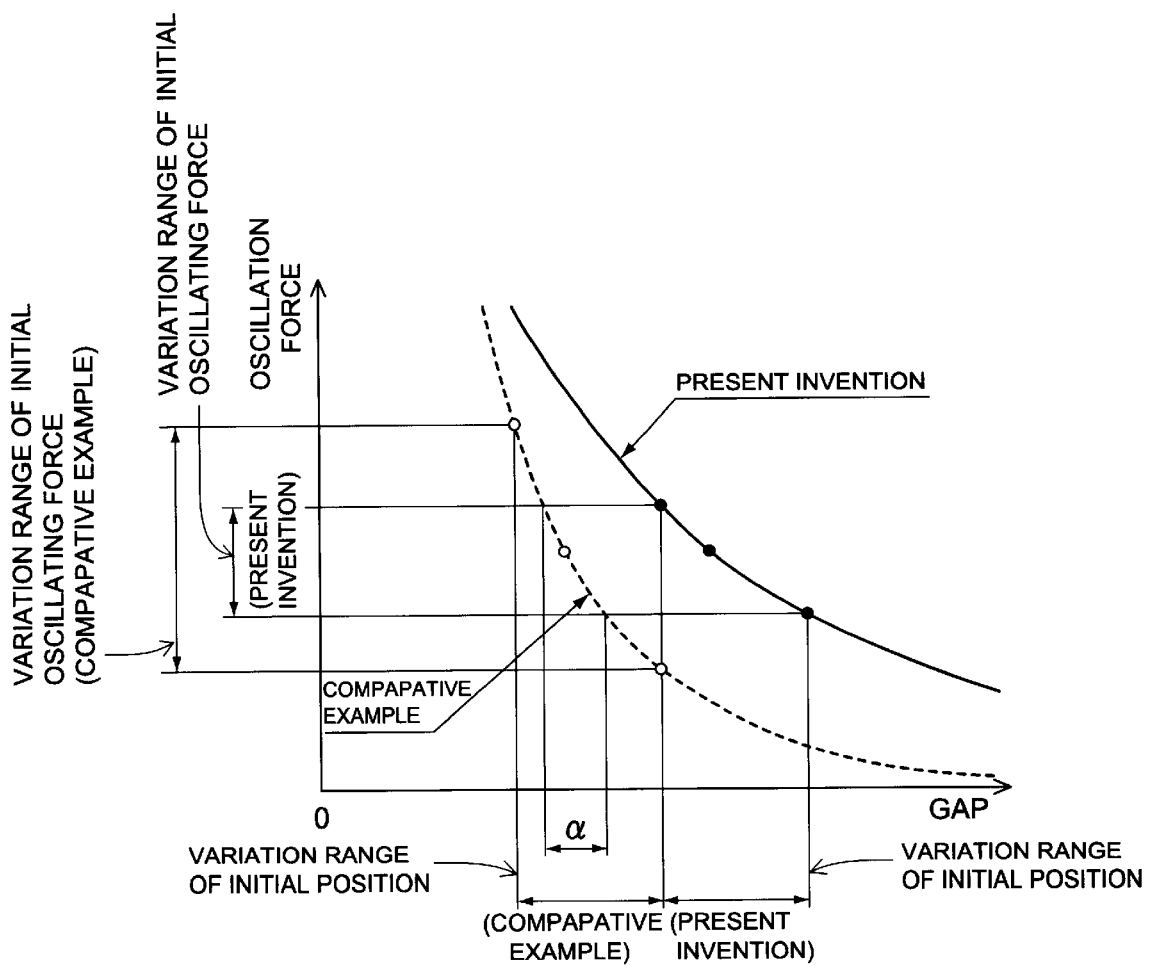
FIG. 5 is a graph showing output characteristics of an oscillating force measured in the vibration damper of FIG. 1, together with those measured in a damper according to comparative example.

The magnitude characteristics of the oscillating force (i.e., the axial driving force applied to the mass member 16) were actually measured in the vibration damper 10 constructed according to the first embodiment of the present invention, upon energizing of the coil 20 by application of a constant alternating current, with respect to three cases where the axial position of the mass member 16 relative to the mounting member 14 were different. Namely, in a first case, the mass member 16 is placed in its original position where the protruding end faces 30, 32 of the mounting member 14 are generally aligned in a direction perpendicular to the axial direction with the bottom surface of the first lower-side recess 48 and the axially lower end face of the mass member 16, respectively. In the second case, the mass member 16 is placed in its separate-position where the mass member 16 is displaced by 1 mm from its original position in the direction remote from the mounting member 14, while in the third case, the mass member 16 is placed in its close-position where the mass member 16 is displaced by 0.5 mm from its original position in the direction close to the mounting member 14. The result is shown in the graph of FIG. 5 where the measurements with respect to the first case are indicated as a desired value, while the measurements of the second and third cases are indicated in the form of proportional values with respect to the desired value. In the graph of FIG. 5, the gap values correspond to the value of L1 as shown in FIG. 4. Upon measuring the magnitude characteristics of the oscillating force of the vibration damper 10, the vibration the vibration damper 10 is arranged so as to satisfy the following formulas: L1=L2, D1=D2.

Figure 6:
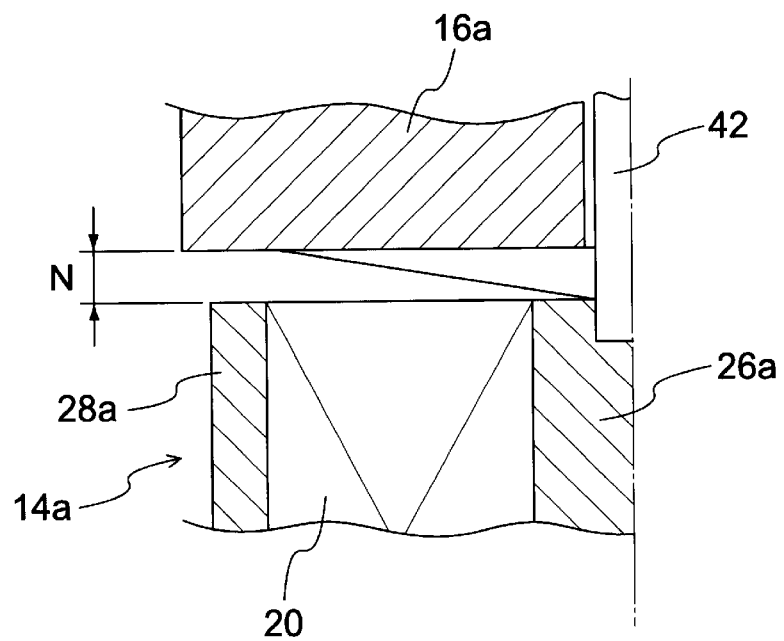
FIG. 6 is a fragmentary enlarged view showing a principal part of a conventional vibration damper.

As a comparative example, the magnitude characteristics of the oscillating force were also measured in a conventional vibration damper as illustrated in FIG. 6, which includes a mounting member 14a in which the inner and outer circumferential wall portions 26a, 28a have the same axial dimension, while the mass member 16a has an axially lower end face having a flat surface. Like in the vibration damper 10, the axial distance: N between the mounting and mass members 14a, 16a are different in the three cases. In the first case, the mass member 16a is placed in its original position where the axial distance: N has a value of 2.5 mm. In the second case, the mass member 16a is placed in its separate-position where the mass member 16a is displaced by 1 mm from its original position in the direction remote from the mounting member 14a, while in the third case, the mass member 16a is placed in its close-position where the mass member 16a is displaced by 0.5 mm from its original position in the direction close to the mounting member 14a. The magnitude characteristics of the oscillating force were measured with respect to the three cases, and the result is also shown in the graph of FIG. 5 in the same manner as in the vibration damper 10.

As is apparent from the graph of FIG. 5, the vibration damper 10 permits a significantly large decrease in the amount of variation of the magnitude of the oscillating force, in comparison with the conventional vibration damper, even when they have the same amount of variation of the initial position of the mass member 16. In other words, the conventional vibration damper is required to held the variation of the initial position of the mass member 16a within a very short range: (α) as indicated in the graph of FIG. 5, in order to exhibit a decreased amount of variation of the oscillating force magnitude as in the vibration damper 10 of the present invention.

While the present invention has been described in detail in its presently preferred embodiment, it is to be understood that the invention is not limited to the details of the illustrated embodiments, but may be otherwise modified.

In the illustrated embodiment, the opposite magnetic poles generated in the axially upper end portions of the respective inner and outer circumferential wall portions 26, 28 of the yoke member (i.e., the mounting member 14) are opposed to the corresponding opposite magnetic poles generated in the inner and outer circumferential portions of the oscillating member (i.e., the mass member 16), respectively, in both of the axial direction and in the axially inclined direction. The yoke member and the oscillating member may possibly be arranged such that the magnetic pole of one of the inner and outer circumferential wall portions of the yoke member and the opposite magnetic pole generated in the corresponding one of the inner and outer circumferential portions of the oscillating member are directly opposed to each other in the axial direction, and the magnetic pole of the other circumferential wall portion of the yoke member and the opposite magnetic pole generated in the other circumferential portion of the oscillating member are opposed to each other in the axially inclined direction.

While the mounting member 14 attachable to the vibratile body is adapted to function as a yoke member, in the illustrated embodiment, it is possible to employ a yoke member which is independent of the mounting member. Further, while the mass member 16 functions as the oscillating member, in the illustrated embodiment, an oscillating member which is independent of the mass member is also employable. When the actuator 23 of the present embodiment is used in various kinds of vibration damping device other than the vibration damper, the mass member 16 is not necessarily required. In addition, the oscillating member (i.e., the mass member 16) is elastically supported by the actuator 23 via the metallic springs 18a, 18b, in the illustrated embodiment, the elastic member for elastically connecting the oscillating member to the actuator is no need to be installed in the actuator 10, if the oscillating member such as the mass member is elastically supported by the other member.

Figure 7:
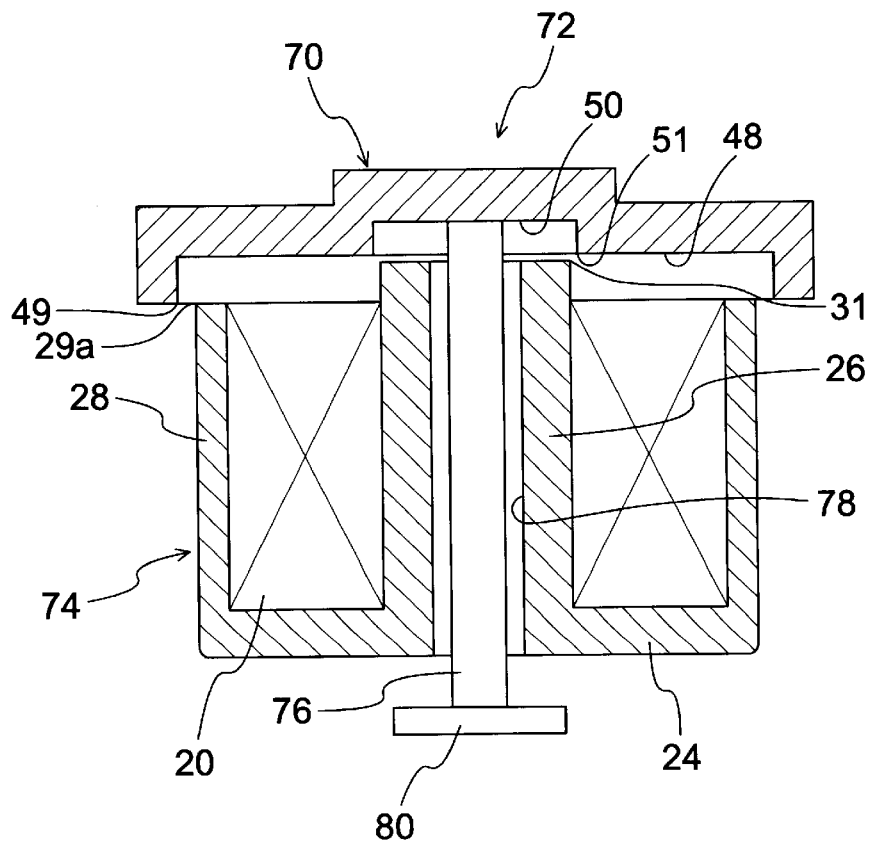
FIG. 7 is an elevational view in longitudinal cross section schematically showing an oscillating force generator constructed according to a second embodiment of the present invention.

For instance, there is schematically shown in FIG. 7, an actuator 72 constructed according to the second embodiment of the present invention, which actuator is used as an oscillating force generator in an active-type vibration damping device such as an engine mount for an automotive vehicle. The actuator 72 includes an oscillating member 70 and a yoke member 74. The oscillating member 70 may be a thin metallic disk member by pressing, for example. The oscillating member 70 may be indirectly elastically connected to the yoke member 74 by utilizing the elastic member of the vibration damping device, so that the oscillating member 70 is elastically positioned relative to the yoke member, for example. In this case, the elastic member is no need to be installed in the actuator 72 as shown in FIG. 7. The actuator 72 may includes a guide rod 76 for preventing a fall of the oscillating member 72 from the yoke member 74. The guide rod 76 is fixedly secured to the oscillating member 72 and extends through a through hole 78 formed in yoke member 74, so that the yoke member 74 is disposed radially outwardly of the guide rod 76, while being movable in the axial direction of the guide rod 76. The guide rod 76 carries a stopper member 80 fixed thereto at its protruding end portion. The stopper member 80 has a diameter larger than that of the through hole 78. The through hole 78 of the yoke member 74 may accommodates a guide bush so that the guide rod 76 is slidably movable in the axial direction along the guide bush. In FIG. 7, the reference numerals used in the preceding embodiment are used to identify the corresponding elements.

Figure 8:
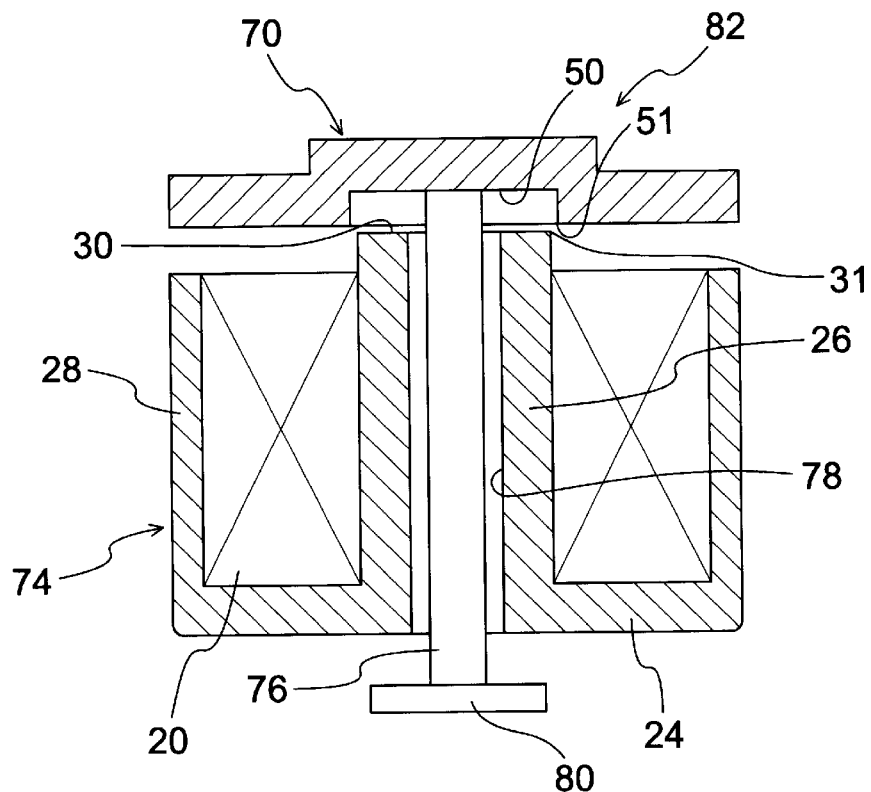
FIG. 8 is an elevational view in longitudinal cross section schematically showing an oscillating force generator constructed according to a third embodiment of the present invention.

Referring next to FIG. 8, there is schematically shown an actuator 82 constructed according to the third embodiment of the present invention. In the actuator 82, the oscillating member 70 used in the second embodiment is modified so as not to have the first lower-side recess 48, so that the axially lower end face of the oscillating member 70 is made plane at its outer circumferential portion. In the actuator 82 constructed as described above, only the inner circumferential portions of the oscillating and yoke members 70, 74 have the respective opposite magnetic poles which are opposed to each other in the inclined axial direction between the circumferential edge portion 31 and the open-end edge portion 51, whereas the outer circumferential portions of the oscillating and yoke members 70, 74 have only the opposite magnetic poles which are directly opposed in the axial direction. According to the actuator 82 of the present embodiment, the opposite magnetic poles are opposed to each other both in the direct axial direction and in the axially inclined direction, between the yoke member 47 and the oscillating member 70. Thus, the actuator 82 can exhibit a desired effect of the present invention as in the first embodiment.

Contrary to the third embodiment, the actuator 82 may be arranged such that only the outer circumferential portions of the oscillating and yoke members 70, 74 have the respective opposite magnetic poles which are opposed to each other in the axially inclined direction, while the inner circumferential portions of the oscillating and yoke members 70, 74 has the respective opposite magnetic poles which are directly opposed in the axial direction only. The specific examples of this type of actuators are schematically illustrated in FIGS. 9–11, by way of example.

Figure 9:
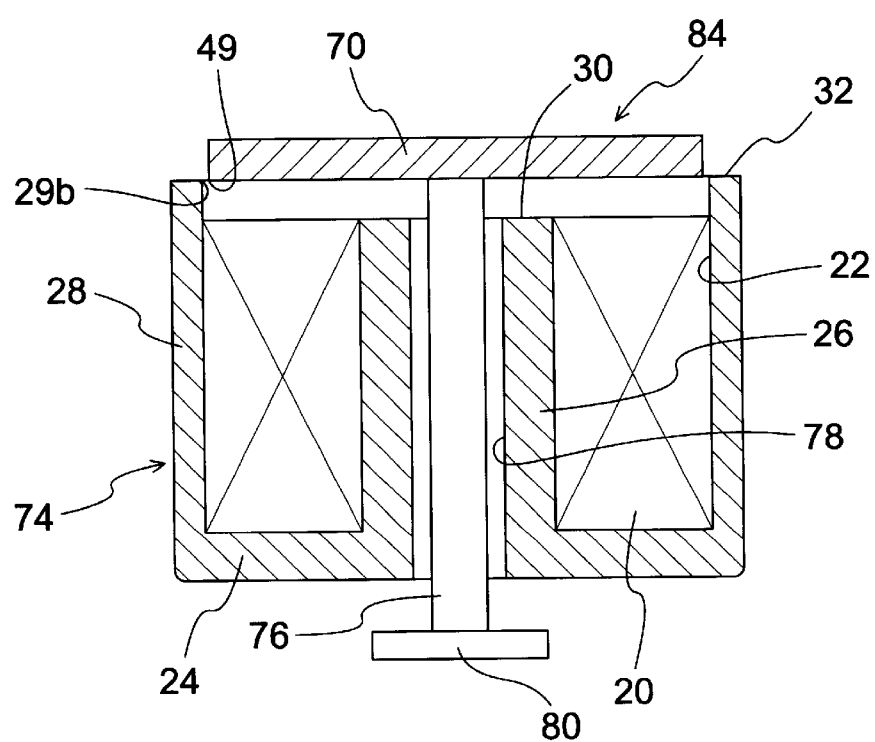
FIG. 9 is an elevational view in longitudinal cross section schematically showing an oscillating force generator constructed according to a fourth embodiment of the present invention.

Referring next to FIG. 9, there is illustrated an actuator 84 constructed according to a fourth embodiment of the present invention. In the actuator 84, the yoke member 74 is arranged such that the outer circumferential wall portion 28 protrudes axially upwardly from the protruding end face 30 of the inner circumferential surface 26, while the oscillating member 70 has a generally plane surface at its axially lower end face. The oscillating member 70 has a diameter which is slightly smaller than the inner diameter of the outer circumferential wall portion 28 of the yoke member 74.

Figure 10:
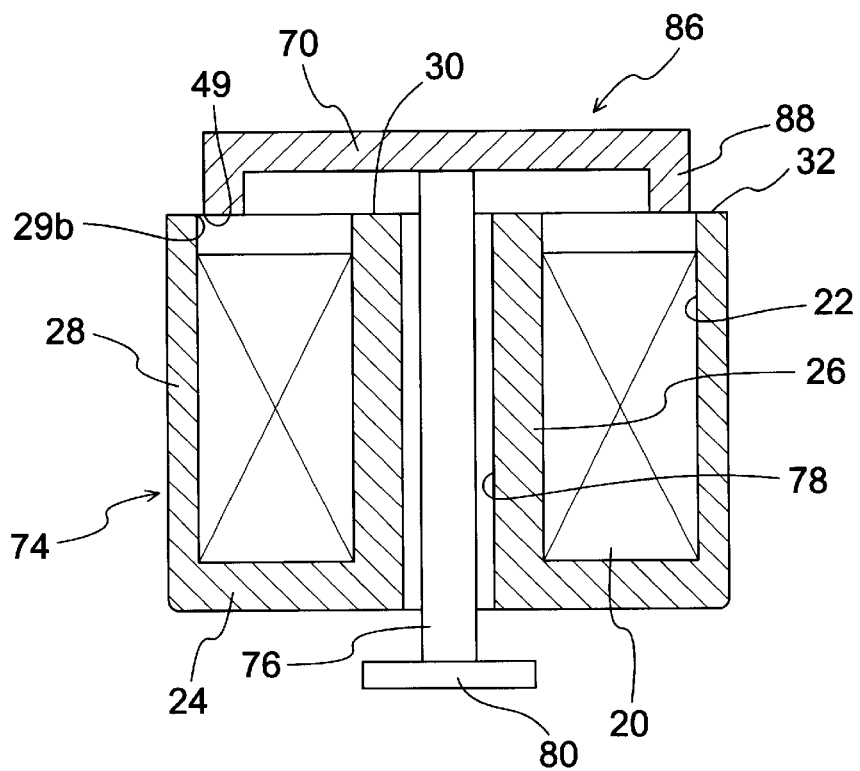
FIG. 10 is an elevational view in longitudinal cross section schematically showing,an oscillating force generator constructed according to a fifth embodiment of the present invention.

Referring next to FIG. 10 showing an actuator 86 constructed according to a fifth embodiment of the present invention, the actuator 86 includes the yoke member 74 in which both of the inner and outer circumferential wall portions 26, 28 protrude in the axially upwardly by a given axial distance, and the oscillating member 70 which includes an annular protrusion 88 which extends axially downwardly as seen in FIG. 10, from the outer circumferential surface of its axially lower end face having a generally plane surface. The annular protrusion 88 has the outer diameter which is slightly smaller than that of the inner diameter of the outer circumferential wall portion 28.

Figure 11:
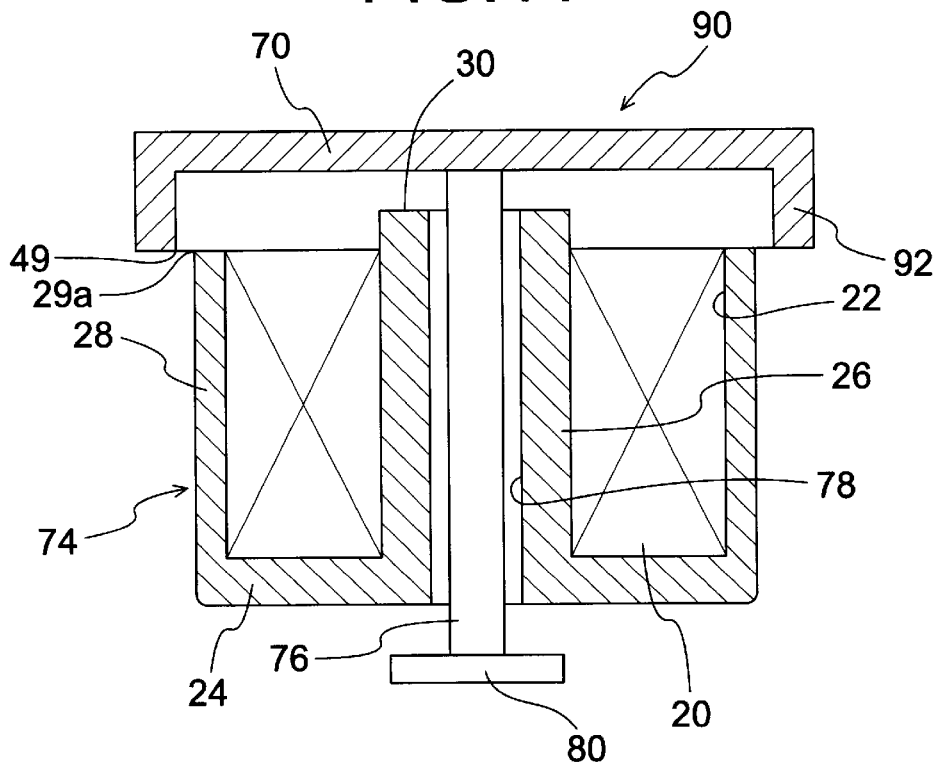
FIG. 11 is an elevational view in longitudinal cross section schematically showing an oscillating force generator constructed according to a sixth embodiment of the present invention.

Referring next to FIG. 11 showing an actuator 90 constructed according to a sixth embodiment of the present invention, the actuator 90 includes the yoke member 74 which is same in construction as the yoke member 74 used in the actuator 72 of the second embodiment, namely the inner circumferential wall portion 28 protrudes axially upwardly from the protruding end face 32 of the outer circumferential wall portion 28, and the oscillating member 70 which includes the integrally formed annular protrusion 92 whose inner diameter is made slightly larger than that of the outer diameter of the outer circumferential wall portion 28.

These actuators 84, 86, 90 as shown in FIGS. 9–11, the yoke member 74 is directly opposed to the oscillating member 70 at the axially protruding end face 30 of its inner circumferential wall portion 26, whereby an effective magnetic attraction is applied to the oscillating member 70. The yoke member 74 is also opposed at an outer or inner circumferential edge portion 29a, 29b of the axially upper end portion of its outer circumferential wall portion 28 to the open-end edge portion 49 formed in the outer circumferential portion of the oscillating member 70 in the axially inclined direction. Thus, these actuator are capable of reducing the variation of the oscillating force due to the variation of the initial position of the oscillating member 70 relative to the yoke member 74 in the axial direction, applying a stable oscillating force to the oscillating member 70 with high stability, thereby exhibiting the desired effect of the present invention.

Figure 12:
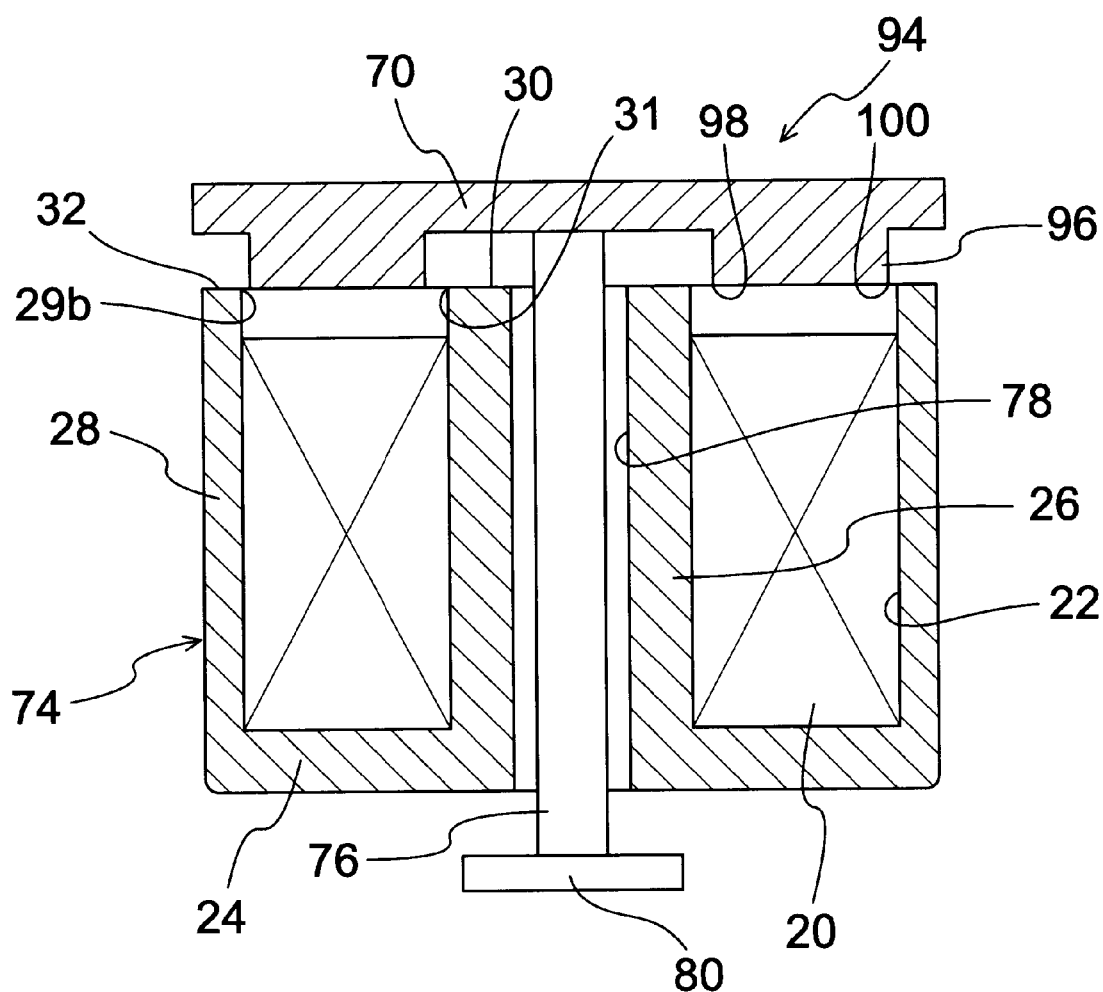
FIG. 12 is an elevational view in longitudinal cross section schematically showing an oscillating force generator constructed according to a seventh embodiment of the present invention.

Referring next to FIG. 12, there is shown an actuator 94 constructed according to the seventh embodiment of the present invention. Like the actuator 72 according to the second embodiment, the actuator 94 includes the opposite magnetic poles which are directly opposed to each other in the axial direction, both in the mutually opposite inner circumferential portions of the yoke and oscillating members 70, 74 and in the mutually opposite outer circumferential portions of the yoke and oscillating members 70, 74, while including the opposite magnetic poles which are opposed to each other in the axially inclined direction, both in the mutually opposite inner circumferential portions of the yoke and oscillating members 70, 74 and in the mutually opposite outer circumferential portions of the yoke and oscillating members 70, 74. More specifically described, the actuator 94 includes the yoke member 74 whose inner and outer circumferential wall portions 26, 28 protrude axially upwardly by a given axial distance, and the oscillating member 70 which have a generally plane surfaces at its axially lower end face and an annular protrusion 96 integrally formed at a radially intermediate portion of the lower end face of the oscillating member 70, so as to protrudes axially downwardly by a given axial distance. The annular protrusion 96 have an inner diameter which is slightly smaller than the diameter of the inner circumferential wall portion 26 of the yoke member 74, while having an outer diameter which is slightly smaller than the inner diameter of the outer circumferential wall portion 28 of the yoke member 74. In the thus constructed actuator 96, the protruding end faces 30, 32 of the inner and outer circumferential wall portions 26, 28 which are magnetized as respective opposite magnetic poles, are directly opposed in the axial direction to the inner and outer circumferential surfaces of the axially lower end face of the mass member 70 which surfaces are magnetized as the corresponding other magnetic poles, respectively. Further, the circumferential edge portion 31 of the inner circumferential wall portion 26 and the inner circumferential edge portion 29b of the outer circumferential wall portion 28 are opposed in the axially inclined direction to inner and outer circumferential edge portions 98, 100 of the protruding portion 96 as the second circumferential edge portions, respectively, where the opposite magnetic poles are accordingly opposed to each other in the axially inclined direction between the mutually opposed edge portions in the inclined axial direction. Therefore, the actuator 96 is capable of effectively reducing the variation of the oscillating force due to the variation of the initial position of the oscillating member 70 relative to the yoke member 74, making it possible to applying a desired oscillating force to the oscillating member 70 with high stability, resulting in excellent vibration damping effect as in the actuators according to other embodiments aforementioned.

While the vibration damper of the first embodiment employs the guide rod for guiding the reciprocal movement of the mass member 16 in the direction in which the oscillating force is applied to the mass member, such a guide rod is not essential to practice the present invention.

In the vibration damper 10 according to the first embodiment, the metallic spring 18a, 18b are used as the elastic member for supporting the mass member 16 on the mounting member 14. The elastic body or other elastic member may be employed for the same purpose. A ferromagnetic material such as steel may be employed as the elastic material, provided the elastic material made of the ferromagnetic material is suitably disposed so that the magnetic field generated by energizing the coil 20 is free from an adverse influence due to the presence of the ferromagnetic material in the magnetic field.

While the illustrated oscillating force generator are all actuators used in a vibration damper for an automotive vehicle, the oscillating force generator according to the present invention is equally applicable to various kinds of other active vibration damping devices for use on an automotive vehicle, such as various kinds of active vibration damping mounts or couplings (bushings), and various kinds of active vibration damping device for various devices or equipment other than the automotive vehicles.

It is to be understood that the present invention may be embodied with various other changes, modifications and improvements which may occur to those skilled in the art without departing from the sprig and scope of the invention defined in the following claims:

What is claimed is:

1. An oscillating force generator for an active-type vibration damper comprising:
    a yoke member made of a magnetic material and having an annular groove open in one of axially opposite end faces thereof, such that said yoke member has an inner and an outer circumferential wall portion which cooperate to partially define said annular groove;
    a coil disposed in said annular groove of said yoke member, said coil being energized by an electric current applied thereto so that a magnetic circuit is formed around said coil, and that said inner and outer circumferential wall portions of said yoke member are magnetized as respective opposite magnetic poles at open end portions thereof; and
    an oscillating member made of a magnetic material and disposed opposite to said one end face of said yoke member in an axial direction of said yoke member with a predetermined axial distance therebetween, said oscillating member having an inner and an outer circumferential portion which are located nearest to said open end portions of said inner and outer circumferential wall portions of said yoke member, respectively, said coil being energized for generating a magnetic force acting on said oscillating member so that an oscillating force is generated between said oscillating member and said yoke member in said axial direction, at least one of said open end portions of said inner and outer circumferential wall portions of said yoke member being directly opposed in said axial direction to said inner and/or outer circumferential portions of said oscillating member, while at least the other open end portion of said inner and outer circumferential wall portions of said yoke member having a first circumferential edge portion which is located nearest to a second circumferential edge portion of said inner and/or outer circumferential portions of said oscillating member, said first and second circumferential edge portions being offset from each other in a direction perpendicular to said axial direction, while being opposed to each other in a direction inclined with respect to said axial direction.

2. An oscillating force generator according to claim 1, wherein said oscillating member is axially displaceable toward said yoke member until said first circumferential edge portion of said yoke member and said second circumferential edge portion of said oscillating member are overlapped with each other in said direction perpendicular to said axial direction, without abutting on each other in said axial direction.

3. An oscillating force generator according to claim 1, wherein said first and second edge portions partially defined by a first and a second cylindrical surfaces, respectively, said first and second cylindrical surfaces extending in said axial direction and being adjacent to each other, said first and second cylindrical surfaces being dimensioned such that said first and second cylindrical surfaces cooperate to define therebetween a clearance as seen in a projection in said axial direction.

4. An oscillating force generator according to claim 1, wherein a distance between said first and second edge portions which are opposed to each other in said direction inclined with respect to said axial direction is not larger than a distance between said at least one of said open end portions of said inner and outer circumferential wall portions of said yoke member and said inner and/or outer circumferential portions of said movable member which are opposed to each other in said axial direction.

5. An oscillating force generator according to claim 1, wherein said inner circumferential wall portion of said yoke member axially outwardly protrudes from said open end portion of said outer circumferential wall portion of said yoke member, while said oscillating member has a central recess which is open in one of axially opposite end faces of said oscillating member that is axially opposed to said yoke member, and which has an inner diameter larger than a diameter of said inner circumferential wall portion of said yoke member, said one axial end face of said oscillating member being directly opposed at said outer circumferential portion thereof to said open end portion of said outer circumferential wall portion of said yoke member, while being opposed at said second circumferential edge portion formed at an open end portion of said central recess to said first circumferential edge portion formed at said open end portion of said inner circumferential wall portion in said direction inclined with respect to said axial direction, said central recess having a bottom surface which is directly opposed in said axial direction to said open end portion of said inner circumferential wall portion of said yoke member with an axial distance therebetween, which axial distance is made larger than the distance between said second circumferential edge portion and said first circumferential edge portion in said direction inclined with respect to said axial direction.

6. An oscillating force generator according to claim 1, wherein said inner circumferential wall portion of said yoke member axially outwardly protrudes from said open end portion of said outer circumferential wall portion of said yoke member, while said oscillating member has a first central recess which is open in one of axially opposite end faces of said oscillating member that is axially opposed to said yoke member, and which has an inner diameter larger than an outer diameter of said outer circumferential wall portion of said yoke member, said first central recess having said second circumferential edge portion at an open end portion thereof, said second circumferential edge portion being opposed to said first circumferential edge portion formed at a radially outer circumferential edge portion of said outer circumferential wall portion of said yoke member in said direction inclined with respect to said axial direction, while a bottom surface of said first central recess being directly opposed to in said axial direction to said open end portion of said outer circumferential wall portion with an axial distance therebetween, which axial distance is made larger than a distance between said second circumferential edge portion and said first circumferential edge portion in said direction inclined with respect to said axial direction, said first central recess having a second central recess open in an bottom surface of said first central recess, said second central recess having an inner diameter larger than the diameter of said inner circumferential wall portion of said yoke member, and having said second circumferential edge portion at an open end portion thereof, said second circumferential edge portion of said second recess being opposed to said first circumferential edge portion formed in said open end portion of said inner circumferential wall portion of said yoke member in said direction inclined with respect to said axial direction, while a bottom surface of said second central recess is directly opposed in said axial direction to said open end portion of said inner circumferential wall portion with an axial distance therebetween, which axial distance is made larger than a distance between said second circumferential edge portion and said first circumferential edge portion in said direction inclined with respect to said axial direction.

7. An oscillating force generator according to claim 1, wherein said outer circumferential wall portion of said yoke member axially outwardly protrudes from said open end portion of said inner circumferential wall portion of said yoke member, while said oscillating member has a generally plane surface at one of axially opposite end faces thereof which end face is axially opposed to said yoke member, and which has a diameter smaller than an inner diameter of said outer circumferential wall portion of said yoke member, said oscillating member being directly opposed in said axial direction at said inner circumferential portion of said plane surface thereof to said open end portion of said inner circumferential wall portion of said yoke member, with a first predetermined distance therebetween in said axial direction, while being opposed at said second circumferential edge portion formed at an outer periphery of said plane surface thereof to said first circumferential edge portion formed at a radially inner circumferential edge portion of said outer circumferential wall portion in said direction inclined with respect to said axial direction, with a second predetermined distance therebetween in said direction inclined with respect to said axial direction, said second predetermined distance is made smaller than said first predetermined distance.

8. An oscillating force generator according to claim 1, wherein said inner and outer circumferential wall portion of said yoke member axially outwardly protrudes from an end face of said coil, while said oscillating member has a generally plane surface at one of axially opposite end faces thereof which end face is axially opposed to said yoke member, and having an annular protrusion formed at and protrudes axially outwardly from an outer circumferential portion of said plane surface of said oscillating member, while having an outer diameter which is smaller than an inner diameter of said outer circumferential wall portion of said yoke member, said oscillating member being directly opposed in said axial direction at said inner circumferential portion of said plane surface thereof to said open end portion of said inner circumferential wall portion of said yoke member, with a first predetermined distance therebetween in said axial direction, while being opposed at said second circumferential edge portion formed at an radially outer circumferential edge portion of said protrusion thereof to said first circumferential edge portion formed at a radially inner circumferential edge portion of said outer circumferential wall portion of said yoke member in said direction inclined with respect to said axial direction, with a second predetermined distance therebetween in said direction inclined with respect to said axial direction, said second predetermined distance is made smaller than said first predetermined distance.

9. An oscillating force generator according to claim 1, wherein said inner circumferential wall portion of said yoke member axially outwardly protrudes from said open end portion of said outer circumferential wall portion of said yoke member, while said oscillating member has a generally plane surface at one of axially opposite end faces thereof which end face is axially opposed to said yoke member, and having an annular protrusion formed at and protrudes axially outwardly from an outer circumferential portion of said plane surface of said oscillating member, while having an outer diameter which is larger than that of the outer circumferential wall portion of said yoke member, said oscillating member being directly opposed in said axial direction at said inner circumferential portion of said plane surface thereof to said open end portion of said inner circumferential wall portion of said yoke member, with a first predetermined distance therebetween in said axial direction, while being opposed at said second circumferential edge portion formed at an radially inner circumferential edge portion of said protrusion thereof to said first circumferential edge portion formed at a radially outer circumferential edge portion of said outer circumferential wall portion of said yoke member in said direction inclined with respect to said axial direction, with a second predetermined distance therebetween in said direction inclined with respect to said axial direction, said second predetermined distance is made smaller than said first predetermined distance.

10. An oscillating force generator according to claim 1, wherein said inner and outer circumferential wall portion of said yoke member axially outwardly protrudes from an end face of said coil, while said oscillating member has a generally plane surface at one of axially opposite end faces thereof which end face is axially opposed to said yoke member, and having an annular protrusion formed at and protrudes axially outwardly from an radially intermediate portion of said plane surface of said oscillating member, while having an inner diameter larger than a diameter of said inner circumferential wall portion of said yoke member and an outer diameter smaller than an inner diameter of said outer circumferential wall portion of said yoke member, said oscillating member being directly opposed in said axial direction at said inner and outer circumferential portions of said plane surface thereof to said open end portions of said inner and outer circumferential wall portions of said yoke member, respectively, with a first predetermined distance therebetween in said axial direction, while being opposed at said second circumferential edge portions formed at an radially inner and outer circumferential edge portions of said protrusion thereof to said first circumferential edge portions formed at said open end portion of said inner circumferential wall portion and a radially inner circumferential edge portion of said outer circumferential wall portion, respectively, in said direction inclined with respect to said axial direction with a second predetermined distance therebetween in said direction inclined with, respect to said axial direction, said second predetermined distance is made smaller than said first predetermined distance.

11. An active-type vibration damper comprising:

a mounting member attachable to a subject body vibration of which to be damper;

a mass member;

an elastic body elastically connecting said mass member to said mounting member; and an actuator for oscillating said mass member including an oscillating force generator, wherein said oscillating force generator includes a yoke member made of a magnetic material and having an annular groover open in on of axially opposite end faces thereof, such that said yoke member has an define said annular groov a coil disposed in said annular groov of said yoke member said coil being energizer by an electric current applied thereto so that a magnetic circuit is formed around said coil, and that said inner and outer circumferential wall portions of said yoke member are magnetized as respective opposite magnetic poles at open end portions thereof, and an oscillating member made of a magnetic material and disposed opposite to said one end face of said yoke member in an axial direction of said yoke member with a predetermined axial distance therebetween, said oscillating member having an inner and an outer circumferential portion which are located nearest to said open end portions of said inner and outer circumferential wall portions of said yoke member, respectively said coil being energized for generation a magnetic force acting on said oscillating member so that an oscillating force is generated between said oscillating member and said yoke member in said axial direction, at least one of said open end portions of said inner and outer circumferential wall portions of said yoke member being directly opposed in said axial direction to said inner and/or outer circumferential portions of said oscillating member while at least the other open end portion of said inner and outer circumferential wall portions of the yoke member having a first circumferential edge portion which is located nearest to a second circumferential edge portion of said inner and/or outer circumferential portions of said oscillating member, said first and second circumferential edge portions being offset from each other in a direction perpendicular to said axial direction, while being opposed to each other in a direction inclined with respect to said axial direction, said oscillating force generator being accommodated in said vibration damper such that said yoke member is fixedly supported by said mounting member, while said oscillating member is fixedly secured to said mass member, so that said oscillating force generator applying said oscillating force to said mass member.

12. An active-type vibration damper according to claim 11, wherein said mounting member made of a magnetic material constitutes said yoke member and/or said mass member made of a magnetic material constitutes said oscillating member.

13. An active-type vibration damper according to claim 11, further comprising a guide rod fixed to said yoke member so as to extend axially outwardly from said yoke member toward said mass member, said mass member having a through hole through which said guide rod extend in an axial direction thereof, so that said mass member is disposed radially outwardly of said guide rod, while being reciprocally movable in said axial direction of said guide rod.

* * * * *